United States Patent
Yamana et al.

(10) Patent No.: US 6,753,376 B1
(45) Date of Patent: Jun. 22, 2004

(54) AQUEOUS WATER-AND OIL-REPELLENT DISPERSION

(75) Inventors: Masayuki Yamana, Settsu (JP); Tsukasa Aga, Settsu (JP); Masahiro Miyahara, Settsu (JP); Masaki Fukumori, Settsu (JP); Ryosuke Hara, Settsu (JP)

(73) Assignee: Daikin Industries Ltd., Osaka (JP)

(*) Notice: Subject to any disclaimer, the term of this patent is extended or adjusted under 35 U.S.C. 154(b) by 0 days.

(21) Appl. No.: 09/868,767

(22) PCT Filed: Dec. 14, 1999

(86) PCT No.: PCT/JP99/07006

§ 371 (c)(1),
(2), (4) Date: Jul. 31, 2001

(87) PCT Pub. No.: WO00/37583

PCT Pub. Date: Jun. 29, 2000

(30) Foreign Application Priority Data

Dec. 22, 1998 (JP) .......................................... 10-364298

(51) Int. Cl.⁷ .............................. C08J 3/00; C08K 5/06; C08L 27/12; B32B 27/04; B32B 27/12
(52) U.S. Cl. ..................... 524/544; 428/421; 428/422; 442/80; 442/82; 524/366; 524/377
(58) Field of Search ................................ 524/366, 377, 524/544; 428/421, 422; 442/80, 82

(56) References Cited

U.S. PATENT DOCUMENTS 5,883,175 A  *  3/1999  Kubo et al.

FOREIGN PATENT DOCUMENTS

| JP | 60-40182 | 3/1985 |
| JP | 5-263070 | 10/1993 |
| JP | 6-17034 | 1/1994 |
| JP | 6-74409 | 9/1994 |
| JP | 8-73836 | * 8/1996 |
| JP | 9-25478 | 1/1997 |
| WO | WO97/48780 | 12/1997 |

OTHER PUBLICATIONS

English language translation of International Preliminary Examination Report for PCT/JP99/07006 dated Jan. 4, 2001.

* cited by examiner

Primary Examiner—Patrick D. Niland
(74) Attorney, Agent, or Firm—Sughrue Mion, PLLC

(57) ABSTRACT

An aqueous water- and oil-repellent dispersion containing: (A) a homopolymer or copolymer containing at least one polymerizable compound having a perfluoroalkyl or perfluoroalkenyl group and an acrylate or methacrylate group, or a copolymer containing said polymerizable compound and another compound copolymerizable therewith, (B) an organic solvent which is tripropylene glycol, and (C) a surfactant, has durable water- and oil-repellency and excellent storage stability.

8 Claims, No Drawings

AQUEOUS WATER-AND OIL-REPELLENT DISPERSION

FIELD OF THE INVENTION

The present invention relates to an aqueous water- and oil-repellent dispersion comprising a polymer containing a polymerizable compound having a perfluoroalkyl or perfluoroalkenyl group and an acrylate or methacrylate group, which can impart the water- and oil repellency to various fibers.

RELATED ARTS

It is well known that a polymer of a polymerizable compound having a perfluoroalkyl or perfluoroalkenyl group and an acrylate or methacrylate group can be used as a water- and oil-repellent for a fibrous fabric. An aqueous dispersion which is prepared by dispersing the polymer in an aqueous medium by means of an emulsifier widely has the industrial utilization. However, the water- and oil-repellency of a fibrous fabric treated with usual conventional aqueous dispersions is not satisfactory for resistance, namely durability, to physical action such as friction. In addition, the conventional aqueous dispersions do not have excellent storage stability even if they have the durable water- and oil repellency.

SUMMARY OF THE INVENTION

One of the objects of the present invention is to provide an aqueous water- and oil-repellent dispersion having durable water- and oil-repellency and excellent storage stability.

The present invention provides an aqueous water- and oil-repellent dispersion comprising:

(A) a homopolymer or copolymer comprising at least one polymerizable compound having a perfluoroalkyl or perfluoroalkenyl group and an acrylate or methacrylate group, or a copolymer comprising said polymerizable compound and another compound copolymerizable therewith, (B) an organic solvent which is tripropylene glycol, and (C) a surfactant.

DETAILED EXPLANATION OF THE INVENTION

In the copolymer, which is the polymer (A), comprising the polymerizable compound having the perfluoroalkyl or perfluoroalkenyl group and the acrylate or methacrylate group and the another compound copolymerizable therewith, the former compound is in the amount of at least 25% by weight, preferably at least 40% by weight based on the weight of the copolymer.

Examples of the polymerizable compound having the perfluoroalkyl or perfluoroalkenyl group and the acrylate or methacrylate group include (meth)acrylate esters represented by the formulas:

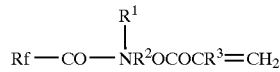 (1)

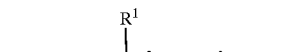 (2)

 (3)

 (4)

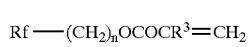 (5)

$Rf-O-Ar-CH_2OCOCR^3=CH_2$ (6)

wherein Rf is a perfluoroalkyl or perfluoroalkenyl group having 3 to 21 carbon atoms, $R^1$ is a hydrogen atom or an alkyl group having 1 to 10 carbon atoms, $R^2$ is an alkylene group having 1 to 10 carbon atoms, $R^3$ is a hydrogen atom or a methyl group, Ar is an aryl group which optionally has a substituent group, and n is an integer of 1 to 10.

Specific examples of the polymerizable compound include:

$CF_3(CF_2)_7(CH_2)OCOCH=CH_2$,
$CF_3(CF_2)_6(CH_2)OCOC(CH_3)=CH_2$,
$(CF_3)_2CF(CF_2)_6(CH_3)_2OCOCH=CH_2$,
$CF_3(CF_2)_7(CH_2)_2OCOC(CH_3)=CH_2$,
$CF_3(CF_2)_7(CH_2)_2OCOCH=CH_2$,
$CF_3(CF_2)_7SO_2N(CH_3)(CH_2)_2OCOCH=CH_2$,
$CF_3(CF_2)_7SO_2N(C_2H_5)(CH_2)_2OCOC(CH_3)=CH_2$,
$(CF_3)_2CF(CF_2)_6CH_2CH(OCOCH_3)CH_2OCOC(CH_3)=CH_2$,
$(CF_3)_2CF(CF_2)_6CH_2CH(OH)CH_2OCOCH=CH_2$,

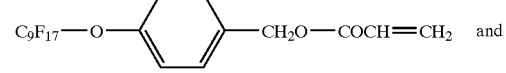 and

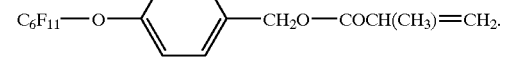

The another copolymerizable compound are various. Examples of the another copolymerizable compound include: (1) acrylic acid and methacrylic acid, and methyl, ethyl, butyl, isobutyl, t-butyl, propyl, 2-ethylhexyl, hexyl, decyl, lauryl, stearyl, isobornyl, P-hydroxyethyl, glycidyl, phenyl, benzyl and 4-cyanophenyl esters thereof; (2) vinyl esters of fatty acids such as acetic acid, propionic acid, caprylic acid, lauric acid and stearic acid; (3) styrene compounds such as styrene, a-methylstyrene and p-methylstyrene; (4) vinyl halides and vinylidene compounds such as vinyl fluoride, vinyl chloride, vinyl bromide, vinylidene fluoride and vinylidene chloride; (5) fatty acid allyl esters such as allyl heptanoate, allyl caprylate and allyl caproate; (6) vinyl alkyl ketones such as vinyl methyl ketone and vinyl ethyl ketone; (7) acryl amides such as N-methylacrylamide and N-methylolmethacrylamide; and (8) dienes such as 2,3-dichloro-1,3-butadiene and isoprene.

The organic solvent in the present invention is tripropylene glycol, $H[OCH_2CH(CH_3)]_3OH$.

The amount of the organic solvent (B) may be from 5 to 200 parts by weight, for example from 10 to 100 parts by weight, particularly from 20 to 60 parts by weight, based on 100 parts of the polymer (A).

The surfactant (C) used for dispersing the polymer and the organic solvent may be a cationic emulsifier, an anionic emulsifier or a nonionic emulsifier. The surfactant is preferably the cationic emulsifier, the nonionic emulsifier or a mixture of both. In the case of the mixture, a preferable weight ratio of the cationic emulsifier to the nonionic emulsifier is from 1:9 to 9:1. Specific examples of the cationic emulsifier include dodecyl trimethyl ammonium acetate, trimethyl tetradecyl ammonium chloride, hexadecyl trimethyl ammonium bromide, trimethyl octadecyl ammonium chloride, (dodecylmethyl-benzyl) trimethyl ammonium chloride, benzyl dedecyl dimethyl ammonium chloride, methyl dodecyl di(hydropolyoxy-ethylene) ammonium chloride, benzyl dodecyl di(hydropoly-oxyethylene) ammonium chloride, benzyl dodecyl di(hydropolyoxyethylene) ammonium chloride and N-[2-(diethylamino)ethyl]oleamide hydrochloride. Specific examples of the nonionic emulsifier include a condensation product of ethylene oxide with hexyl phenol, iso-octyl phenol, hexadecanol, oleic acid, alkane($C_{12}$–$C_{16}$)thiol, sorbitan monofatty acid ($C_7$–$C_{19}$) or alkyl($C_{12}$–$C_{18}$)amine and the like.

The amount of the surfactant (C) may be from 0.01 to 30 parts by weight, for example from 1 to 20 parts by weight, based on 100 parts by weight of the polymer (A).

The dispersion according to the present invention can be prepared by emulsion-polymerizing the polymerizable compound(s) in water accompanied by the organic solvent (B) in the presence of the surfactant to give an emulsion of the polymer (A). Water and/or the surfactant may be added to the emulsion of the polymer (A).

Examples of a suitable substrate, to which the dispersion according to the present invention is applied, include a film, a fiber, a yarn, a woven fabric, a carpet, a filament made from a natural polymer material, a modified natural polymer material and a synthetic polymer material, and a product made from a fiber and a yarn. The substrate is preferably a textile which is in the form of a fiber, a yarn or a fabric.

The dispersion according to the present invention can be applied to the substrate preferably by coating, dipping, spraying, padding, roll coating, or combination of these procedures. For example, a padding bath having the bath solid content of 0.1 to 10% by weight can be used. The substrate is padded in the bath, and then excess liquid is usually removed by a squeezing roll to give the dry pickup amount (the weight of dry polymer on the substrate) of from 0.01 to 10% by weight based on the weight of the substrate. Then, the treated substrate is preferably heated at 100–200° C.

PREFERRED EMBODIMENTS OF THE INVENTION

Examples and Comparative Examples are shown hereinafter to illustrate the present invention in detail.

Properties are determined as follows:

Water- and Oil-repellency

The polymer dispersion liquid is diluted with water to give a treatment liquid having a solid content of 0.08% by weight. A polyester fabric is immersed in the treatment liquid, squeezed with a mangle to give a wet pickup of 65%, dried at 100° C. for two minutes, heated at 160° C. for one hour, and then subjected to an evaluation of water- and oil-repellency.

The water-repellency is expressed by the water repellency No. (cf. the following Table 1) determined by the spray method according to JIS (Japanese Industrial Standard) L-1092.

The oil-repellency is determined by dropping several drops of a test solution shown in AATCC-TM118 (Table 2) on two positions of a surface of a test cloth and observing the penetration state of the drops after 30 seconds. The maximum point at which the test solution exhibits no penetration is expressed by the oil-repellency.

TABLE 1

| Water repellency No. | State |
|---|---|
| 5 | No wet on the surface |
| 4 | Slight wet on the surface |
| 3 | Partial wet on the surface |
| 2 | Wet on the surface |
| 1 | Wet over the whole surface |

TABLE 2

| Oil repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane/Nujol mixture solution (35/65 by weight) | 29.6 |
| 1 | Nujol | 31.2 |
| 0 | Inferior to 1 | — |

Storage stability

After the aqueous dispersion (solid content: 30% by weight) is stored at 40° C. for one month, the generation of precipitation is observed.

○: No precipitation

Δ: Slight precipitation

×: Much precipitation

EXAMPLE 1

100 g of $C_nF_{2n+1}CH_2CH_2OCOCH=CH_2$ (a mixture of compounds wherein n is 6, 8, 10, 12 and 14 (average of n is 8)), 50 g of stearyl acrylate, 2 g of N-methylol acrylamide, 200 g of pure water, 40 g of tripropylene glycol, 0.3 g of acetic acid, 4 g of alkyl trimethyl ammonium chloride and 10 g of polyoxyethylenealkylphenyl ether were charged into a 500 mL flask and emulsified at 60° C. for 15 minutes by means of ultrasonic wave with stirring. 0.75 g of azobisisobutylamidine dihydrochloride was added and the reaction was continued for 5 hours to give an aqueous dispersion of a polymer.

The water- and oil-repellency and the storage stability were evaluated. The results are shown in Table 3.

EXAMPLE 2

100 g of $C_nF_{2n+1}CH_2CH_2OCOCH=CH_2$ (a mixture of compounds wherein n is 6, 8, 10, 12 and 14 (average of n is 8)), 50 g of stearyl acrylate, 2 g of 3-chloro-2-hydroxypropyl methacrylate, 200 g of pure water, 30 g of tripropylene glycol, 0.3 g of acetic acid, 4 g of alkyl trimethyl ammonium chloride and 10 g of polyoxyethylenealkylphenyl ether were charged into a 500 mL flask and emulsified at 60° C. for 15 minutes by means of ultrasonic wave with stirring. 0.75 g of azobisisobutylamidine dihydrochloride was added and the reaction was continued for 5 hours to give an aqueous dispersion of a polymer.

The water- and oil-repellency and the storage stability were evaluated. The results are shown in Table 3.

EXAMPLE 3

100 g of $C_nF_{2n+1}CH_2CH_2OCOCH=CH_2$ (a mixture of compounds wherein n is 6, 8, 10, 12 and 14 (average of n is 8)), 25 g of stearyl acrylate, 25 g of 2-ethylhexyl methacrylate, 200 g of pure water, 80 g of tripropylene glycol, 0.3 g of acetic acid, 4 g of alkyl trimethyl ammonium chloride and 10 g of polyoxyethylenealkyl ether were charged into a 500 mL flask and emulsified at 60° C. for 15 minutes by means of ultrasonic wave with stirring. 0.75 g of azobisisobutyl-amidine dihydrochloride was added and the reaction was continued for 5 hours to give an aqueous dispersion of a polymer.

The water- and oil-repellency and the storage stability were evaluated. The results are shown in Table 3.

EXAMPLE 4

100 g of $C_nF_{2n+1}CH_2CH_2OCOCH=CH_2$ (a mixture of compounds wherein n is 6, 8, 10, 12 and 14 (average of n is 8)), 50 g of stearyl acrylate, 2 g of diacetone acrylamide, 200 g of pure water, 50 g of tripropylene glycol, 0.3 g of acetic acid, 4 g of alkyl trimethyl ammonium chloride and 10 g of polyoxyethylenealkylphenyl ether were charged into a 500 mL flask and emulsified at 60° C. for 15 minutes by means of ultrasonic wave with stirring. 0.75 g of azobisisobutyl-amidine dihydrochloride was added and the reaction was continued for 5 hours to give an aqueous dispersion of a polymer.

The water- and oil-repellency and the storage stability were evaluated. The results are shown in Table 3.

EXAMPLE 5

100 g of $C_nF_{2n+1}CH_2CH_2OCOCH=CH_2$ (a mixture of compounds wherein n is 6, 6, 10, 12 and 14 (average of n is 8)), 25 g of stearyl acrylate, 25 g of 2-ethylhexyl methacrylate, 2 g of N-methylolacrylamide, 200 g of pure water, 60 g of tripropylene glycol, 0.3 g of acetic acid, 4 g of alkyl trimethyl ammonium chloride and 10 g of polyoxyethylenealkyl ether were charged into a 500 mLL flask and emulsified at 60° C. for 15 minutes by means of ultrasonic wave with stirring. 0.75 g of azobisisobutylamidine dihydrochloride was added and the reaction was continued for 5 hours to give an aqueous dispersion of a polymer.

The water- and oil-repellency and the storage stability were evaluated. The results are shown in Table 3.

Comparative Example 1

The procedure of Example 1 was repeated except that 40 g of propylene glycol was used instead of 40 g of tripropylene glycol.

Comparative Example 2

The procedure of Example 1 was repeated except that 40 g of dipropylene glycol was used instead of 40 g of tripropylene glycol.

Comparative Example 3

The procedure of Example 2 was repeated except that 30 g of propylene glycol was used instead of 30 g of tripropylene glycol.

Comparative Example 4

The procedure of Example 2 was repeated except that 30 g of dipropylene glycol was used instead of 30 g of tripropylene glycol.

Comparative Example 5

The procedure of Example 4 was repeated except that 50 g of propylene glycol was used instead of 50 g of tripropylene glycol.

TABLE 3

| | Water- and oil repellency | | | | | | |
|---|---|---|---|---|---|---|---|
| | Initial | | Durability | | | | |
| | | | HL-3 | | DC-3 | | |
| | Water-repellency | Oil-repellency | Water-repellency | Water-repellency | Water-repellency | Water-repellency | Storage stability |
| Ex. 1 | 5 | 6 | 4 | 4 | 4 | 3 | ○ |
| Ex. 2 | 5 | 6 | 4 | 4 | 4 | 3 | ○ |
| Ex. 3 | 5 | 7 | 4 | 5 | 4 | 4 | ○ |
| Ex. 4 | 5 | 6 | 4 | 4 | 4 | 3 | ○ |
| Ex. 5 | 5 | 7 | 4 | 5 | 4 | 4 | ○ |
| Com. Ex. 1 | 5 | 6 | 4 | 4 | 4 | 3 | x |
| Com. Ex. 2 | 5 | 6 | 4 | 4 | 4 | 3 | Δ |
| Com. Ex. 3 | 5 | 6 | 4 | 4 | 4 | 3 | x |
| Com. Ex. 4 | 5 | 6 | 4 | 4 | 4 | 3 | x |
| Com. Ex. 5 | 5 | 6 | 4 | 4 | 4 | 3 | x |

Note)
HL-3: After 3 times washing according to a JIS L-0217-103 method
DC-3: After 3 times dry cleaning according to a JIS L-1092-322 method

EFFECTS OF THE INVENTION

Tripropylene glycol used in the present invention is excellent in no harm. The aqueous dispersion according to the present invention is effective for decreasing the environmental pollution and has durable water- and oil-repellency and excellent storage stability.

What is claimed is:

1. An aqueous water- and oil-repellent dispersion comprising:
    (A) a homopolymer or copolymer comprising at least one polymerizable compound having a perfluoroalkyl or perfluoroalkenyl group and an acrylate or methacrylate group, or a copolymer comprising said polymerizable compound and another compound copolymerizable therewith,
    (B) an organic solvent which is tripropylene glycol, and
    (C) a surfactant,
    wherein the amount of the organic solvent (B) is from 5 to 200 parts by weight, based on 100 parts by weight of the polymer (A), and a polymer in the dispersion consists essentially of the polymer (A) prepared by emulsion-polymerizing the polymerizable compound in water accompanied by the organic solvent (B).

2. The dispersion according to claim 1, wherein the amount of the organic solvent (B) is from 10 to 100 parts by weight, based on 100 parts by weight of the polymer (A).

3. A textile, to which the dispersion according to claim 1 is applied.

4. A method of producing the aqueous water- and oil-repellent dispersion according to claim 1, comprising steps of:
    emulsion-polymerizing at least one polymerizable compound having a perfluoroalkyl or perfluoroalkenyl group and an acrylate or methacrylate group in water accompanied by an organic solvent which is tripropylene glycol to give an emulsion of a polymer of the polymerizable compound.

5. The dispersion according to claim 1, wherein the amount of the organic solvent (B) is from 20 to 60 parts by weight, based on 100 parts by weight of the polymer (A).

6. The dispersion according to claim 1, wherein the surfactant (C) is a cationic emulsifier, a nonionic emulsifier or a mixture of a cationic emulsifier and a nonionic emulsifier.

7. The dispersion according to claim 1, wherein the amount of the surfactant (C) is from 0.01 to 30 parts by weight, based on 100 parts by weight of the polymer (A).

8. The dispersion according to claim 7, wherein the amount of the surfactant (C) is from 1 to 20 parts by weight, based on 100 parts by weight of the polymer (A).

* * * * *